United States Patent [19]

Maher et al.

[11] 4,254,605

[45] Mar. 10, 1981

[54] HAY CONDITIONER

[76] Inventors: Jack Maher, "Shangrilah", N. Condobolin Rd., Forbes, New South Wales, 2871; Grosvenor F. Francis, Berowra, Leadville, Via Dunedoo, New South Wales, 2744, both of Australia

[21] Appl. No.: 45,878

[22] Filed: Jun. 6, 1979

[51] Int. Cl.³ ............................................ A01D 14/02
[52] U.S. Cl. .................................... 56/14.4; 56/16.4; 56/192
[58] Field of Search ............. 56/14.4, 16.4, .1, DIG. 1, 56/192, 14.5, 16.5, 16.6

[56] References Cited

U.S. PATENT DOCUMENTS

| | | |
|---|---|---|
| 3,585,730 | 6/1971 | Morse .................................. 56/13.9 |
| 3,714,766 | 2/1973 | Ender et al. ........................... 56/192 |
| 3,928,955 | 12/1975 | Case .................................. 56/DIG. 1 |

Primary Examiner—Robert A. Hafer
Attorney, Agent, or Firm—Stevens, Davis, Miller & Mosher

[57] ABSTRACT

A hay conditioner comprised of a hay pick-up, a covered conveyor, a discharge chute and a steam generator in communication with a plurality of steam input nozzles, wherein the conditioned hay is continuously discharged from the chute as the vehicle progresses so as to traverse a windrow.

1 Claim, 4 Drawing Figures

HAY CONDITIONER

This invention relates generally to an agricultural implement and more particularly to a hay conditioner of a new and improved kind.

Referring to the prior art, after the mowing of a standing crop, such as lucerne for example, it has usually been the practice to leave the windrow for two or three days to 'cure' in the sun and wind before picking it up progressively by means of a hay baler having a forwardly-mounted pick-up in the form of a rake. The windrow material to be so cured is left on the ground until it has the dry appearance which results after having had its moisture content reduced to approximately 17% by weight.

The hay baler feeds the material so obtained from a windrow into the compressing chamber of the baler where it is compressed to a weight of about 70 lbs. and then tied with twine or wire to form a bale: the resulting bales are allowed to fall out onto the ground at regular intervals. The bales are then picked up from the ground and taken to a suitable storage site for subsequent disposal directly as fodder or for the production of such as chaff or meal at a later date.

In this connection, it will be appreciated that dew which falls on a windrow throughout the night is most essential to ensure that the leaf will not fracture on impact when it comes into contact with the baler mechanism. On the other hand, if a dewfall is too heavy, it may then be necessary to allow the windrow to remain for a period of 1 or 2 hours in the sun until the moisture content is once again low enough (that is, about 17% by weight) for the picking up and baling operation. This optimum moisture content condition, however, may well last only for a few hours. Particularly during a spell of hot, 'drying' weather, overnight dewfall may be completely absent and so allow the windrow material to become overcured before it can be garnered, with the result that the material fractures on impact and produces unsatisfactory bales liable to crumble during handling. As is all too common, little or no dew may settle on windrows for night after night in heatwave conditions and finally a storm will seriously damage the windrowed hay—which should have long been safely garnered and stored—reducing it to low grade quality or even effectively destroying it completely.

It is an object of the present invention to eliminate, or at least minimize, the above and certain other disadvantages and therefore, in accordance with the present invention, there is provided a hay conditioner comprising a wheeled chassis towable by a vehicle en echelon and supporting a hay pick-up, a covered conveyor, a discharge chute and a steam generator in communication with a plurality of steam input nozzles located adjacent the input region of said conveyor; whereby conditioned hay is continuously discharged from said chute as said vehicle progresses so as to traverse a windrow with said hay pick-up.

In a first mode of operation, the hay conditioner according to the present invention is adapted to pick up undercured (that is, too moist) material from a windrow and deposit it upon the conveyor at the input region thereof so that it is conveyed to, and discharged from, said discharge chute—which is disposed only about two feet above ground level in this mode of operation—to be deposited gently back upon the ground without turning over the material of the windrow, as is presently done by a hay rake. There are three advantages to be gained by the operation of the inventive hay conditioner; firstly, the material of the windrow does not undergo what is known as "double bleaching", which is undesirable and liable to occur if the windrow material is turned completely over, as the material is merely loosened and allowed to settle gently onto the cut stubble and dry ground, preferably by means of an offset baffle or guide member disposed beneath the said discharge chute, to permit more rapid curing; and secondly, unwanted, worthless material is less likely to be gathered up and deposited in the windrow, as often happens in present techniques. For example, it is common practice in the harvesting of light crops to have two windrows raked into one so as to suit the capacity of modern hay balers. During this process it quite often happens that tines are broken off the rake and are deposited in the windrow causing serious damage to processing machinery. The third advantage is that as the windrow material is lifted quite gently instead of being dragged aside, new growth coming up through the windrow is not damaged.

The loosened material allows air to circulate and move freely so that is in better condition for rapid curing, after which it is picked up by the pick-up of a hay baler for subsequent processing. A short, secondary conveyor, pivoted for movement in a horizontal plane, may be provided at the discharge end of the main conveyor to enable two windrows to be made into one as will be explained later.

In a second mode of operation, the hay conditioner according to the present invention is adapted to pick up dewlacking, overcured windrow material (that is, material too dry for satisfactory baling) and deposit it upon the conveyor at the input region thereof where it is continuously treated by jets of steam from nozzles fed by steam from the steam generator. The windrow material in its passage along the conveyor is moistened sufficiently, before it is ejected from the discharge chute, so that it is in proper condition to be picked up by a conventional hay baler which is preceded by the hay conditioner according to the present invention.

Alternatively, the conveyor may discharge directly, via the discharge chute, onto the conveyor of a following hay baler or a similar implement.

In order that the reader may gain a better understanding of the invention, hereinafter are described certain preferred embodiments thereof, by way of example only, with reference to the accompanying drawings in which, FIG. 1 is a side view of the invention, presented schematically for greater clarity;

FIG. 3 is a scrap view of the conveyor with its cover removed and the decking broken away to show the steam manifold; and FIG. 4 shows a secondary conveyor attached downstream of the main conveyor.

Figure 1:
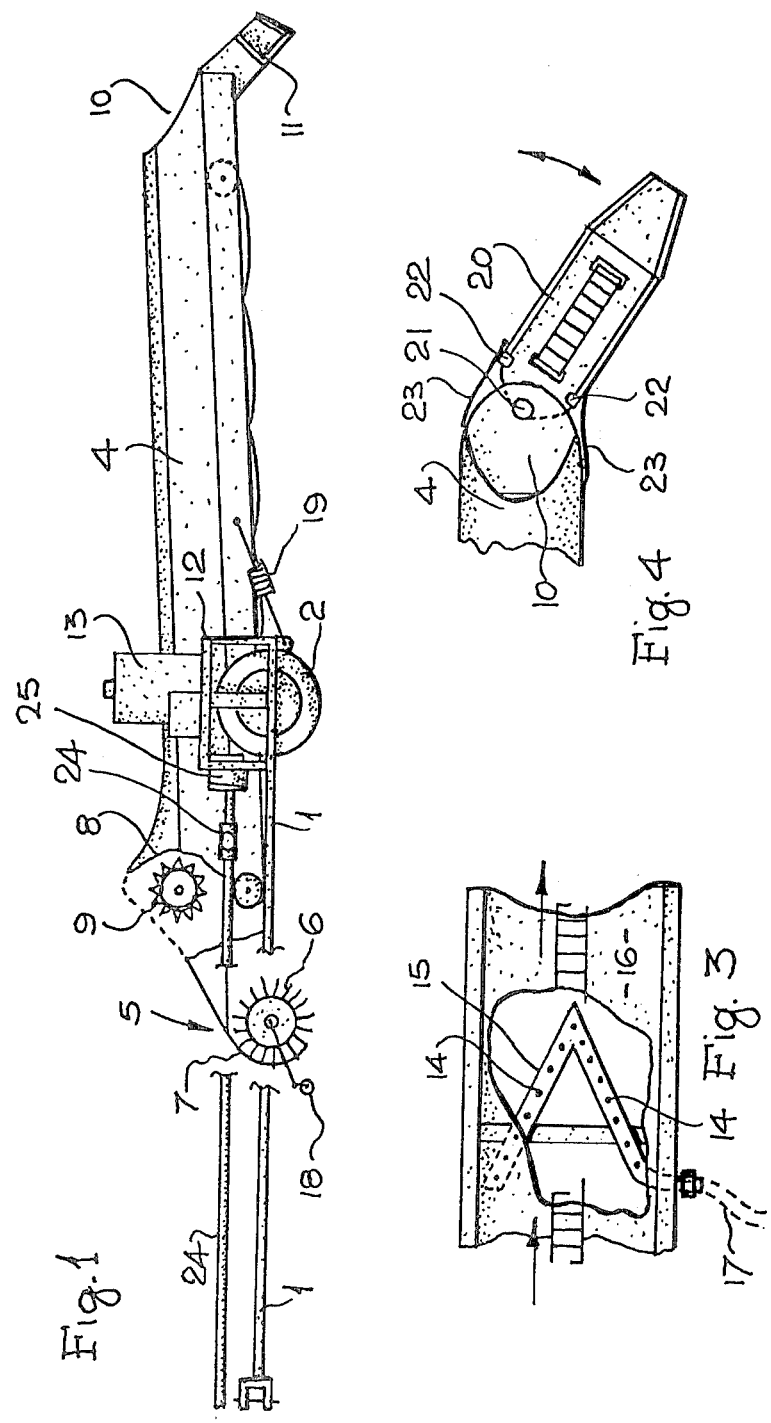
Figure 2:
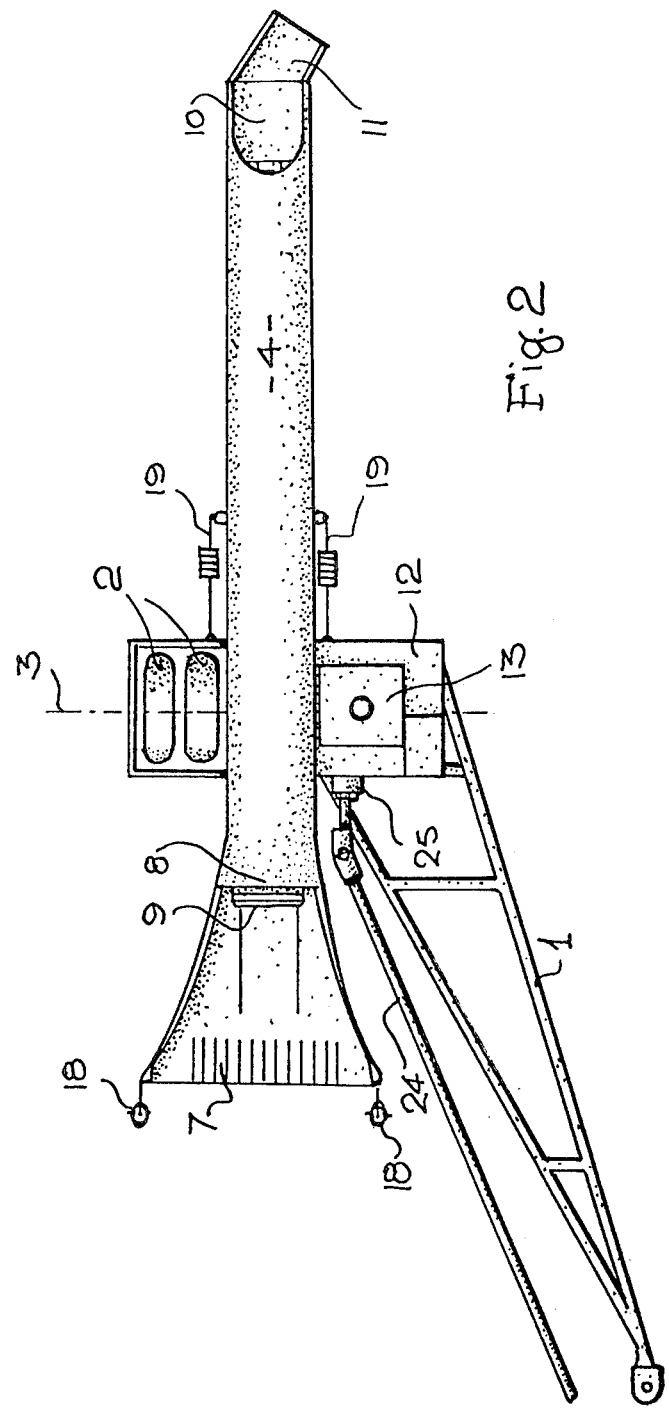
FIG. 2 is a corresponding plan view.

The hay conditioner according to the present invention has a chassis 1 preferably constructed from tubular metal components, mounted upon dual wheels 2. In front of the wheels' axle 3, the chassis 1 extends forwardly to provide a hitching arrangement for attachment to the rear of an agricultural tractor. The length of this forward extension, from axle to hitch, may be of the order of 10 to 15 feet to permit untrammelled use of the hay pick-up as the implement is towed behind a tractor at walking pace. The forward extension of chassis 1, as can be seen, does not extend normal with respect to axle 3 but at an angle to enable chassis 1, when in tow, to follow not directly behind the tractor but en echelon thereto.

Supported upon chassis 1, between wheels 2, there is a covered-in conveyor 4, preferably of the single chain kind. About one-third of the length of conveyor 4 may extend forwardly of axle 3 and have mounted, at its leading end, a hay pick-up assembly 5 of the rotary type having spring-biased raking tines 6 rotating within a slotted guard 7. The rake and the mouth of the pick-up assembly of which it is part may be three or four feet wide narrowing to a throat 8 of perhaps one to one-and-a-half feet wide. In throat 8 and having an axis of rotation disposed above the input region of conveyor 4 there is mounted a feed roller 9 having serrated combs axially disposed about its periphery and rotatable in a direction opposite to that of the pick-up rake. Conveyor 4 should be as short as possible to enhance manueverability while still being long enough to satisfactorily condition hay in its passage therealong. In practice, a length of the order of 12 to 15 feet will be found suitable.

At the rear end or output region of conveyor 4 there is a discharge chute portion 10 from which conditioned hay is discharged via an offset baffle or guide member 11. The bottom of guide member 11 preferably makes an angle of about 45° to the ground.

Also upon chassis 1, mounted upon a platform 12 there is a steam generator 13 adapted for operation from the towing vehicle. FIG. 3 shows a plurality of steam input nozzles 14 in the form of small holes of ⅛" to 3/16" in diameter in a V-shaped manifold 15 the apex of which points downstream. Steam input nozzles 14 communicate with the interior of covered conveyor 4 through corresponding apertures in the deck 16 of conveyor 4. A flexible conduit 17 connects manifold 15 to steam generator 13.

Hay pick-up 5 may well be supported on small wheels, castors 18 or skids to prevent its 'nosing' into the ground, while conveyor 4 as a whole is adjustable with regard to its height above ground by any suitable means, such as hydraulic lifting arms 19 controlled by the tractor operator or, more simply, by a manually-operated lever system. Input of hay to conveyor 4 may be aided by the usual mechanically-operated forks (not shown).

FIG. 4 illustrates a variation in which a short, secondary conveyor 20 is pivotally attached at 21 to the conveyor 4 for movement in a horizontal plane. The degree of movement may well be in the order of 30°–40° from the centre line of conveyor 4 and to prevent over-slewing of conveyor 20 suitable stops 22 may be provided. Flexible sidewalls 23 prevent windrow material from being discharged in undesirable directions. Ideally, the end of the decking at the discharge chute portion 10 is made semi-circular as shown. Conveyor 20 may well be driven via a flexible drive cable (not shown) in known manner. The use of such a secondary conveyor 20 enables two adjacent windrows to be made into a single windrow in the first mode of operation without the dragging aside of material as occurred in prior art techniques.

Rotary pick-up rake assembly 5, feed roller 9 and conveyor 4 may all be powered from the power take-off of the tractor, initially via transmission shaft 24 to a sprocket-box 25 mounted on chassis 1 and thence by such as chain drives to rake 5, feed roller 9 and conveyor 4.

Power to operate steam generator 13 may also be drawn from the tractor.

It will be seen from the foregoing description that the present invention permits hay to be baled during all of the daylight hours in place of just those few hours in which the natural moisture content of the windrow is correct.

In the prior art operation, an average morning's tally is in the order of 500 bales before fracturing on impact begins to occur and thus forces operations to cease whereas the use of the present invention permits a day's tally of approximately 1200 bales to be made.

It may be noted that the use of two hay balers—and the cost of a hay baler is presently in excess of $10,000—working one paddock, together would not exceed the tally achieved by a single hay baler and the device of the present invention working in conjunction.

A further economic advantage accruing from the present invention is that the harvesting contractor or the farmer can now bale hay wherever he so desires, once curing is correct, thus reducing the possibility of weather damage and improving both quality and quantity and that the cartage contractor can put his trucks and hired labour to a full day's work instead of the present few hours for which he must pay a full day's wages.

I claim:

1. A hay conditioner comprising, in combination, a wheeled chassis having angled towing means so that it is towable by a vehicle en echelon, said wheeled chassis supporting:

a hay pick-up reel on the forward portion thereof;

a covered conveyor extending toward the rear of said chassis;

a secondary conveyor downstream from said covered conveyor;

an offset, downwardly-angled guide chute; and a steam generator and associated conduits in communication with a plurality of steam inlet jets disposed in a V-shaped manifold with the apex thereof pointing downstream and positioned adjacent the input region of said covered conveyor, said manifold being mounted upon the underside of the deck of said covered conveyor, which is provided with corresponding apertures therein;

said hay pick-up reel being positioned near ground level in communication with said input region of said covered conveyor, the output region of which communicates with the input region of said secondary conveyor, the output region of which communicates, in turn, with said offset, downwardly-angled guide chute;

said secondary conveyor, which is short as compared with the length of said covered conveyor, being pivotally attached at the discharge end of the said covered conveyor for movement in a horizontal plane; and said offset, downwardly-angled guide chute extending from the trailing end of said secondary conveyor.

* * * * *